April 22, 1952   H. Z. GORA   2,593,668
MANUFACTURE OF COMPOSITE ARTICLES
Filed June 3, 1949   10 Sheets-Sheet 4

Fig. 5

INVENTOR.
Henry Z. Gora
BY
Johnson and Kline
ATTORNEYS

April 22, 1952     H. Z. GORA     2,593,668
MANUFACTURE OF COMPOSITE ARTICLES Filed June 3, 1949     10 Sheets—Sheet 7

INVENTOR.
Henry Z. Gora
BY
Johnson and Kline
ATTORNEYS

April 22, 1952  H. Z. GORA  2,593,668
MANUFACTURE OF COMPOSITE ARTICLES
Filed June 3, 1949  10 Sheets-Sheet 8

INVENTOR.
Henry Z. Gora
BY
Johnson and Kline
ATTORNEYS

April 22, 1952     H. Z. GORA     2,593,668
MANUFACTURE OF COMPOSITE ARTICLES
Filed June 3, 1949     10 Sheets-Sheet 10

INVENTOR.
Henry Z. Gora
BY
Johnson and Kline
ATTORNEYS

Patented Apr. 22, 1952

2,593,668

UNITED STATES PATENT OFFICE 2,593,668

MANUFACTURE OF COMPOSITE ARTICLES

Henry Z. Gora, Stratford, Conn., assignor to The Gora-Lee Corporation, Stratford, Conn., a corporation of Connecticut Application June 3, 1949, Serial No. 96,965

29 Claims. (Cl. 18—5)

This invention relates to the manufacture of composite articles of the type in which a part formed of moldable material is joined to a separate non-moldable part or article to form an integral unitary product. Such an article may be exemplified by a headed fastener in the form of a nail, tack, or the like, having its metallic head embedded in a decorative envelope or covering of a suitable moldable material which may be a thermoplastic, or rubber, synthetic or natural, or other elastomer molded around and usually completely enclosing the metallic head.

Heretofore, it has been customary to manufacture articles of this type by an injection or compression molding process using a two-part, multi-cavity mold. Prior to molding, a nail or other non-moldable part was placed in the cavity, after which the mold was closed by clamping the two parts thereof together, and the moldable head-forming material injected through channels in the mold parts into each cavity around the inserted non-moldable part to form the desired composite product. When the moldable material required curing, as in the case of a rubber product, it was necessary to keep the mold closed for the entire curing period, after which the molded unit comprising the various molded portions with the connecting scrap or fin adhering thereto was stripped from the mold. Thereafter the individual articles were separated from the scrap, usually by a tumbling operation requiring still further time.

Obviously, such procedure has been slow and cumbersome, and has resulted in a relatively high cost of manufacture for the articles produced. An object of this invention is to provide an improved method and apparatus for manufacturing composite articles having moldable parts in which the speed of manufacture is greatly increased and the cost of manufacture correspondingly reduced.

A further object is to provide an improved method and apparatus for manufacturing compound articles having moldable parts in a continuous operation capable of high productive capacity.

A further object is to provide a substantially automatic machine for continuously producing headed articles, such as nails, tacks or the like with heads formed of a relatively resilient material so molded in place as to provide a unitary, integral product.

A feature of the invention is the provision of a mechanism whereby an endless succession of non-moldable articles or parts, such as the metallic bodies of nails, tacks or other devices, and a continuous strip of moldable material are continuously and simultaneously moved along contiguous paths. While so moving, portions are severed from the strip and are applied to the nail heads or other parts in sequence, and molded in place thereon to form a resilient envelope which preferably completely encloses the nail head or similar part.

A further feature is the provision in a machine for the described purpose of a continuously moving carrier having a plurality of holders for continuously carrying successive non-moldable articles or parts through an operating zone in which the moldable parts are applied to and molded thereon.

A further feature is the provision of a mechanism for both ejecting the finished articles and expelling any residual moldable material from the article holders after each molding operation whereby any accumulation of unused moldable material in the article holding members is avoided and the latter are maintained in a clean, operative condition.

A further feature is the provision of a loading mechanism at a loading station past which an article carrier moves continuously, and the operation of such mechanism in synchronism with the carrier to supply articles to holders on the carrier as they move in succession past the loading station.

A further feature is the provision in a rotary type machine of dies for forming and molding the moldable part constructed and arranged for relative movement along rectilinear lines, thus avoiding the disadvantages of relative die movement on curved lines, while retaining the advantages of continuous production at a high rate obtained by use of a rotary type machine.

These and other objects and advantages which will appear hereinafter are accomplished by the present invention.

For the purpose of illustration, the invention is shown and described as embodied in a machine for providing nails, tacks or other headed fasteners with decorative heads formed of a resilient moldable material which is applied to and molded around the metallic nail head to enclose it and provide a composite nail, in which the parts formed from moldable and non-moldable materials are integrally joined together. The decorative head can be formed of any suitable moldable material such, for example, as a thermoplastic, or a synthetic or natural rubber or rubber-like material, or any other material which may be inherently moldable, or rendered moldable by a preliminary treatment.

Figures 2, 3:
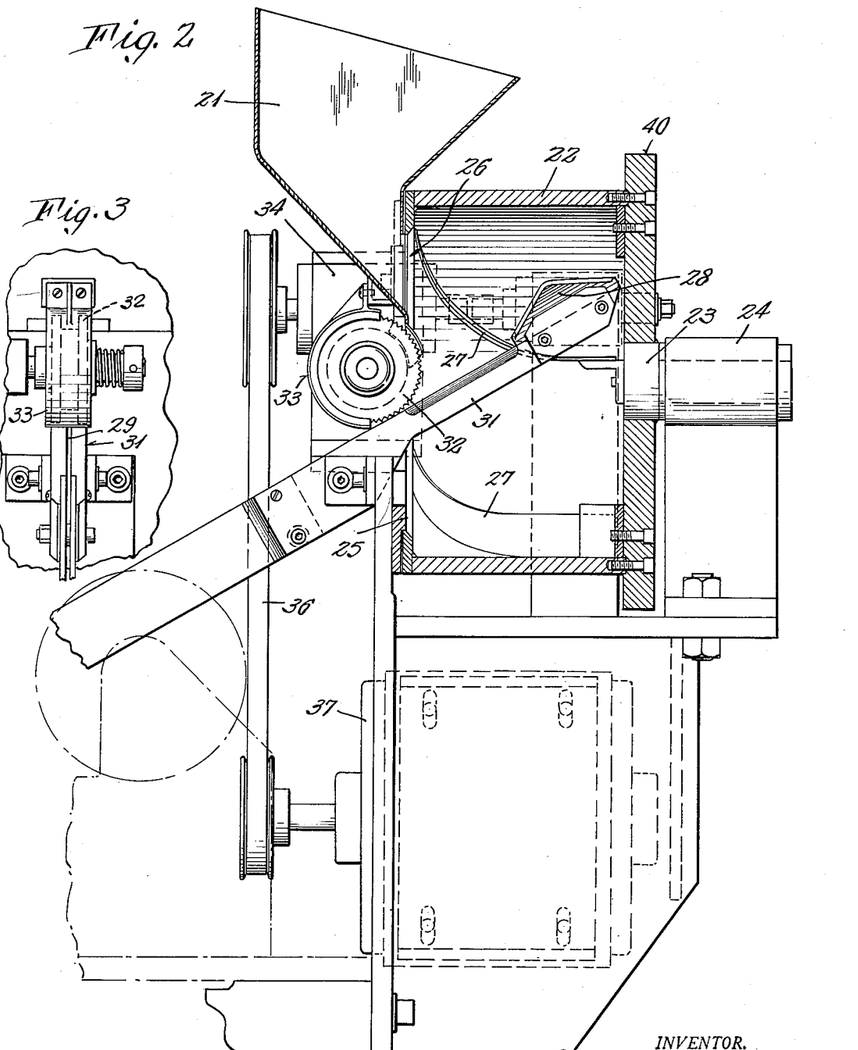
Fig. 2 is a view partly in section of the feeding mechanism and hopper for non-moldable articles or parts shown in Fig. 1 and taken from the right thereof.
Fig. 3 is an elevation of certain details illustrated in Fig. 2.

As illustrated, the machine of the present invention has a feeding mechanism for delivering articles such as nails, tacks, or the like, one at a time to a loading station. This includes a funnel 21 for supplying nails to a supply hopper shown in the form of a rotary cylinder 22 secured to a stub shaft 23 rotatably mounted in a bearing bracket 24 secured to the machine frame. The opposite end of the cylinder 22 is closed by a stationary plate 25 supported on the machine frame and having an opening 26 at its upper end through which nails are supplied to the rotary cylinder from the funnel 21, or from any other source. The inside of the cylinder has a series of spaced curved vanes or plates 27, each of which, as a result of the rotation of the cylinder, picks up a quantity of nails, lifts them to the upper part of the cylinder, and drops them across the axis thereof. A nail collecting throat 28 is located within the cylinder in the path of the falling nails, and the throat is constructed in a known manner to collect and deliver the nails point downward into the slot 29 of a nail feeding chute 31 down which the nails slide to a loading station as hereinafter described. The chute extends through an opening in the cylinder closing plate 25, at which point a rotary star wheel 32 or the like is mounted for rotation counterclockwise as shown in Fig. 2, to prevent improperly positioned nails from sliding down the chute, and to return such nails to the cylinder 22. A guard 33 is supported around the outer circumference of the star wheel 32. As illustrated, the star wheel 32 is rotated by a worm drive 34 driven by a belt 36 from an electric motor 37 or the like supported on the machine frame. The worm shaft 38 has a friction wheel 39 engaging a flange 40 on the rotary cylinder 22 for rotating the latter.

Figure 8:
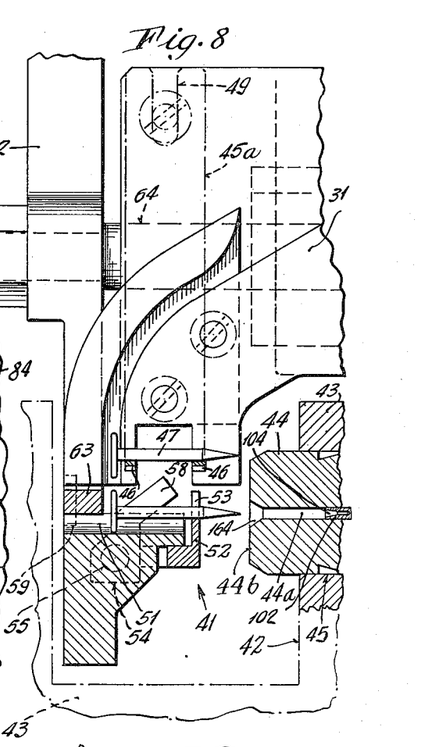

The feeding chute 31 extends downwardly to a loading station 41 located in a slot 42 formed in a rotary die carrier 43. In the form shown the slot 42 is an annular slot provided in the circumferential face of the carrier. The die carrier has a series of article-holding die members 44 having apertures or bores 44a secured in spaced bores 45 around one side of the slot 42. The lower end of the chute 31 is shaped to deliver successive nails to the loading station 41 at right angles to the plane of rotation of the apertured die members 44. As shown in Fig. 8, the chute is curved to position successive nails horizontally. A loading mechanism is provided for loading successive nails into the apertures in bores of successive die members 44 as the latter move past the loading station without requiring any interruption in the movement of the die members or the rotation of the carrier 43.

Figures 7, 9, 10:
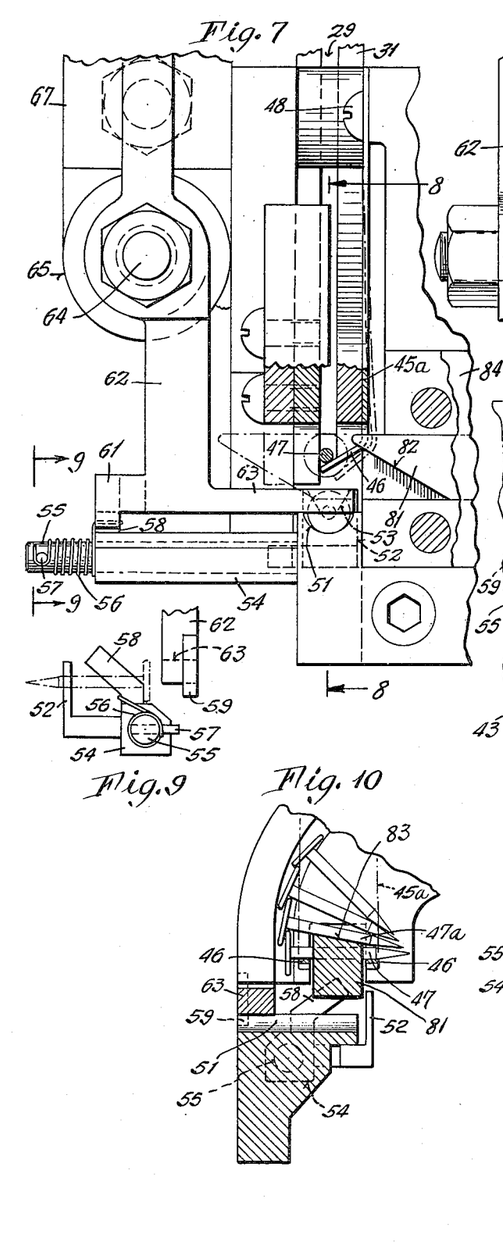
Figs. 7, 8, 9, 10 and 11 are views, partly in section, of the nail feeding and loading mechanism for loading successive nail holders on the rotary carrier as they move past a loading station.

As illustrated in Figs. 7 to 11, the loading mechanism comprises a yieldable supporting member adapted to engage and support the lowermost nail in the chute 31 and normally close the mouth of the chute as illustrated in Fig. 7. This yieldable member is shown in the form of a flat leaf spring 45a having a bifurcated end providing a pair of horizontal nail-supporting fingers 46 on which the lowermost nail 47 in the chute is supported. The spring member 45a is supported by a clamping screw 48 extending through a slot 49 in the upper end of the member 45 so that the latter can be vertically adjusted to accurately position the lowermost nail in the chute.

The illustrated loading mechanism includes a nail holding cradle 51 in which successive nails from the chute 31 are deposited one at a time and from which they are successively loaded into the die members 44 as the latter move past the loading station as shown in Figs. 7 to 11. The cradle 51 supports the nail head directly and is provided with a movable member 52 having a V notch 53 for receiving and supporting the shank of a nail deposited in the cradle. The shank supporting member 52 is mounted at one end of a sleeve 54 rotatably supported on a rod 55. The sleeve is connected to one end of a helical spring 56, the opposite end of which is connected to a pin 57 on the rod 55. The sleeve is intermittently rotated against the tension of the spring 56 by a finger 58 which projects upwardly from the sleeve 54 in the path of a lug 59 on one arm 61 of a slidable nail loading bracket 62. The bracket 62 has a second arm 63 located just above the cradle 51 and adapted to engage the head of a nail in the cradle 51 upon inward movement of the bracket 62. This operation occurs with a snap action which, as hereinafter described, is accurately timed to inject the nail in the cradle into the bore or aperture of a die as it passes the loading station 41. As illustrated, the bracket 62 is secured to an operating shaft 64 slidably mounted in a supporting sleeve 65 secured to the machine frame, see Fig. 6. The bracket 62 extends upwardly and is connected to a short guide shaft 66 parallel to the operating shaft 64 and slidably mounted in a sleeve 67, see Figs. 5 and 6, for steadying and guiding the movement of the slidable bracket 62. A helical spring 68 for providing the snap action surrounds the slidable operating shaft 64 in its supporting sleeve 65 for quickly moving the slidable bracket 62 and nail loading member 63 into the nail loading position shown in Fig. 11. The bracket 62 is positively returned outwardly to the position shown in Figs. 6, 7 and 8 by a rocker arm 71, see Figs. 5 and 6, mounted for rocking movement about a pin 72 and having at one end an adjustable abutment 73 engaging the projecting inner end of the slidable bracket-operating shaft 64. The opposite end of the rocker arm 72 has an upwardly extending cam follower 74 engaging the face of a cam wheel 75, secured to a cam shaft 76 rotatably mounted on the machine frame.

Figure 11:
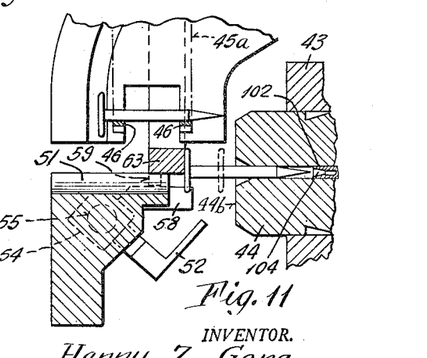

The cam wheel 75 being properly formed to occasion the desired snap action and return movement, it will be apparent that rotation of the wheel oscillates the rocker arm 71 to reciprocate the rod 64 and the slidable bracket 62. The spring 68 drives the bracket 62 inwardly, to the right as shown in Fig. 8, causing the member 63 to engage the head of a nail in the cradle 51 with a quick, snap action, and inject it into the aperture of a die member 44 as it moves past the loading station 41. The final position of the nail in the present machine is indicated by dotted lines in Fig. 11. Inward nail feeding movement of the bracket 62 simultaneously causes the lug 59 on the bracket arm 61 to engage the finger 58 and rotate the sleeve 54 and nail shank-supporting member 52 so that as the nail head moves out of the cradle 51 under impulse of the loading member 63, the shank-supporting member 52 is moved downwardly, as shown in Fig. 11, out of the path of the nail head.

Figure 5:
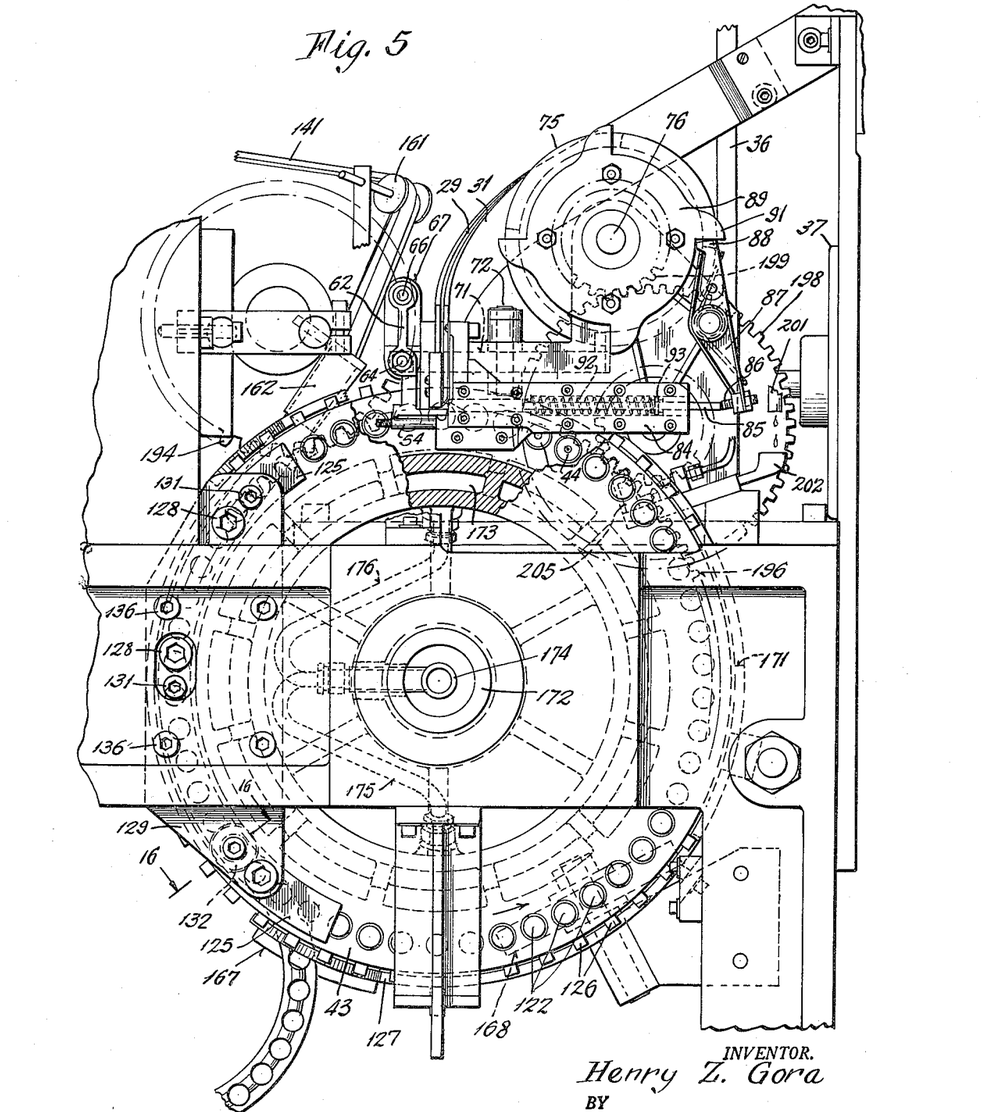
Fig. 5 is a view on an enlarged scale, partly in section, on the line 5—5 of Fig. 1.
Figure 26:
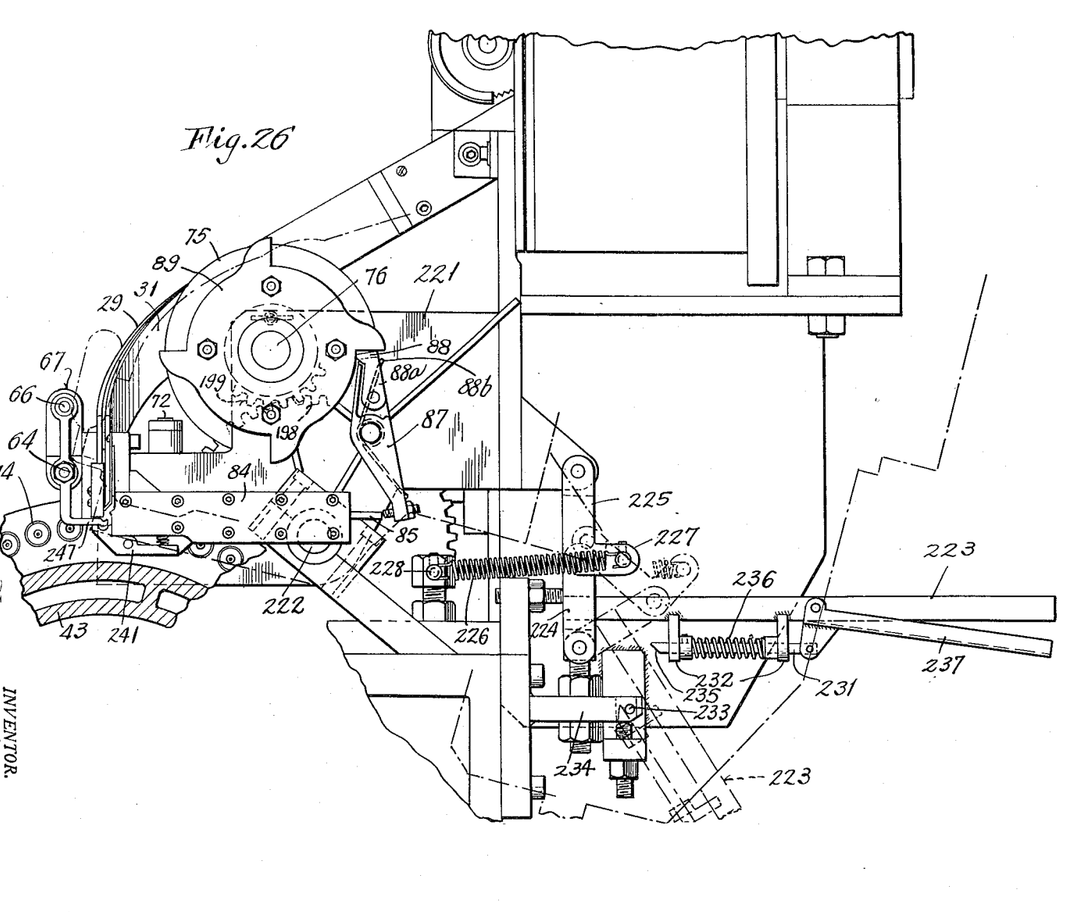
Fig. 26 is a view in elevation of the nail feeding mechanism and its supporting structure, illustrating one arrangement for moving the entire nail feeding assembly as a unit in and out of operative position relatively to the loading station.

The nails in the chute 41 are successively delivered, one at a time, to the cradle 51 by a reciprocating feed member 81 having a beveled nail feeding nose 82, see Fig. 7, adapted upon movement from the full line position to the dot and dash line position to force the bottom nail 47 downwardly past the yielding supporting fingers 46 into the cradle 51. The spring member 45a yields as indicated in dot and dash lines, to permit such movement of the nail. The tapered nose 82 enters the slotted end of the member 45a between the lowermost nail 47 and the next nail 47a, the latter being supported by the upper face 83 of the escapement member so that only one nail is fed at a time to the cradle 51. As shown in Fig. 10, the top face 83 of the feed member is inclined to the horizontal to a degree corresponding with the inclination of the nail 47a so that the nail 47 can be delivered to the cradle without disturbing or canting nail 47a out of its position, thus aiding in preventing jamming of the nails at the mouth of the chute. Upon withdrawal of the feed member 81, the nail 47a drops downwardly onto the supporting fingers 46 which have returned to supporting position as soon as the nail 47 is forced past them. The feed member 81 is slidably supported in a bracket 84, see Figs. 5 and 7, and is connected to a rod 85 extending through the bracket and engaging an adjustable abutment 86 on one end of an oscillating rocker arm 87. The other end of the rocker arm 87 supports a cam follower 88 which engages a cam 89 having spaced cam lobes 91 for intermittently oscillating the rocker arm 87 to move the feed member 81 inwardly. Preferably the cam follower 88 is yieldable. As shown in Figs. 5 and 26, the follower 88 is formed on a follower lever 88a pivoted to the rocker arm 87 and yieldingly held in operative position by a spring 88b. In such a construction the follower will yield should the nail feed mechanism jam for any reason. A helical spring 92 surrounds the rod 85 in the bracket 84 and engages a collar 93 on the rod for yieldably maintaining it in engagement with the abutment 86 on the rocker arm 87. The cam 89 is mounted on the cam shaft 76 for simultaneous rotation with the cam 75 actuating the nail loading bracket 62. Exact synchronization of the feed member 81 and the nail loading mechanism is obtained by relative rotatable adjustment of the cams 75 and 89 on the cam shaft 76.

Each die member 44 has a die face 44b formed on the end of the member around the aperture 44a and forming part of a mold cavity as hereafter described.

Figures 13, 15:
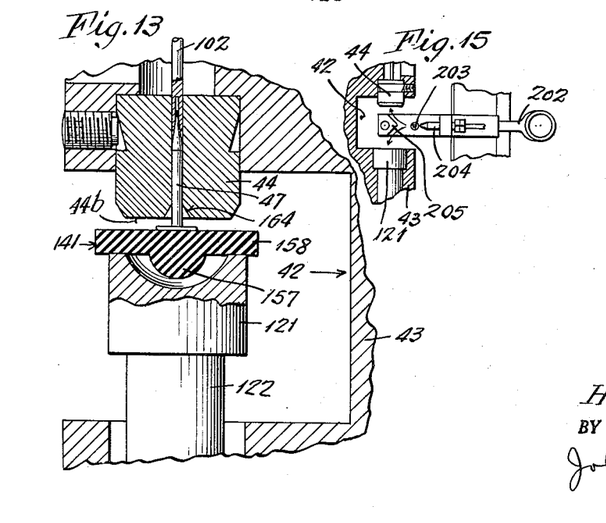
Figs. 14, 15 and 16 are views of structural details.

The position of the non-moldable part in each die member 44 is fixed by a suitable gauge means. For example, the nail 47 is positioned so that its head is spaced outwardly from the die face 44b by the position of a combination gauge and ejector 102 reciprocally mounted in and substantially fitting the aperture 44a of each die member 44. Other forms of gauges can be employed such as that hereinafter described. As illustrated in Fig. 13, each ejector 102 has a tapered mouth 104 for receiving and positioning the pointed end 105 of the nail by engaging the tapered sides of the nail shank inwardly of the pointed end, so as not to injure or dull the nail point. Each ejector 102 is adjustably mounted on a plunger 106 extending outwardly through a bore 107 in the die carrier 43. An arcuate ejector cam 108, which is adjustably mounted as hereinafter described, positions the combined gauge and ejector 102 during the molding operation to correctly locate and hold the non-moldable part. An arcuate cam is adapted to engage a cam follower in the pin 111 projecting radially outwardly from the cam plunger 106 through a slot 112 in the face of the die carrier for retracting the ejector 102 as hereinafter described.

Each ejector 102 is so formed as to engage and scrape the wall of the associated aperture clean so as to expel therefrom all moldable material which may accumulate or be deposited in the bore by the molding operation. This prevents such material accumulating in the die member and interferring with the subsequent loading of the die members with additional nails.

Figure 12:
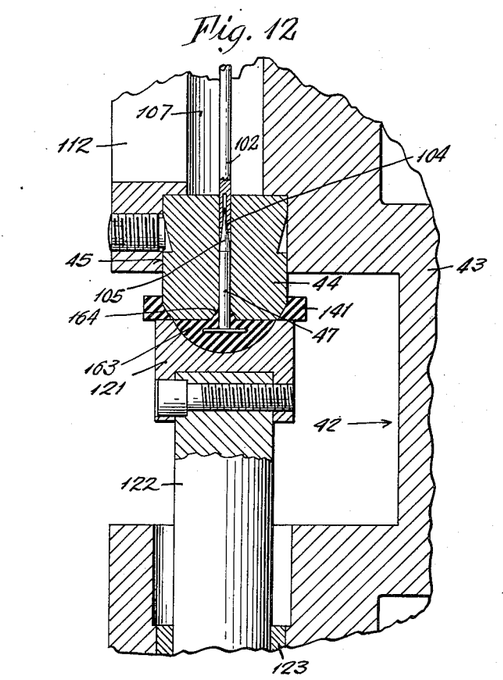
Figs. 12 and 13 are sectional views on an enlarged scale showing two positions of the rectilinearly movable molding dies.

A relatively movable molding die member 121 is supported opposite each nail holding die member 44 for relative movement along rectilinear lines. As illustrated, each movable die member 121 is secured to a die plunger 122 slidably mounted in a bushing 123 supported in a bore 124 in the die carrier on the opposite side of the radial circumferential slot 42 from the nail holidng die members 44. Each movable die member 121 is in alignment with the nail holding die member 44. The opposite end of each die plunger 122 projects outwardly from the carrier 43 in position to be engaged by an arcuate die-closing cam 125 for moving the plunger inwardly to close the dies 121 and 44 in the molding position shown in Fig. 12. Each die plunger is provided with a radially extending pin 126 for engaging an arcuate die opening cam 127 to retract the movable die member 121 to open position as the result of rotation of the die carrier 43.

The die-closing cam 125 and the ejector operating cam 108 are adjustably mounted longitudinally of the die plunger 122 and ejector plunger 106, respectively, to adjust and coordinate the movement imparted to the respective plungers. As illustrated, each cam is supported on cap screws 128 extending through supporting brackets 129 for drawing the cams against adjustable threaded abutment pins 131 to fix the respective cams in rigid adjusted position.

Figure 14:
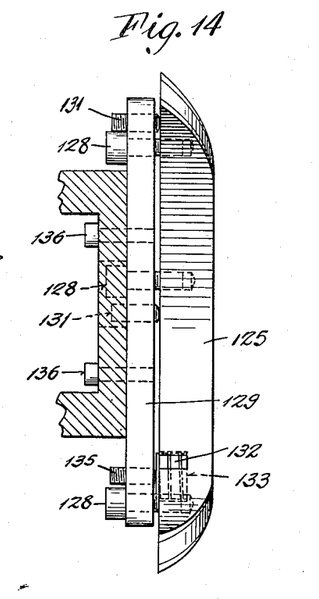
Figure 16:
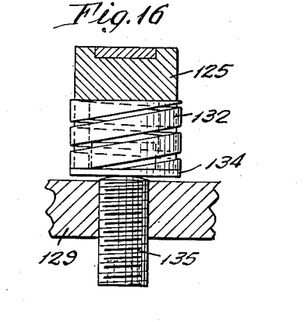

Referring to Fig. 14, one end of each cam, such as the die closing cam 125, is flexibly mounted to permit sufficient yielding thereof under pressure of the associated plungers to accommodate manufacturing tolerances in the length of such plungers. As illustrated in Figs. 14 and 16, this mounting comprises a coil spring 132 mounted in a pocket 133 in the cam member 125 and seating on a spring plate 134 adjustably positioned by a threaded stud 135 extending through the supporting bracket 129. With such an arrangement, the cam plate will yield sufficiently to accommodate plungers which may be slightly oversize, and thus prevent jamming or injury to the machine.

Figure 6:
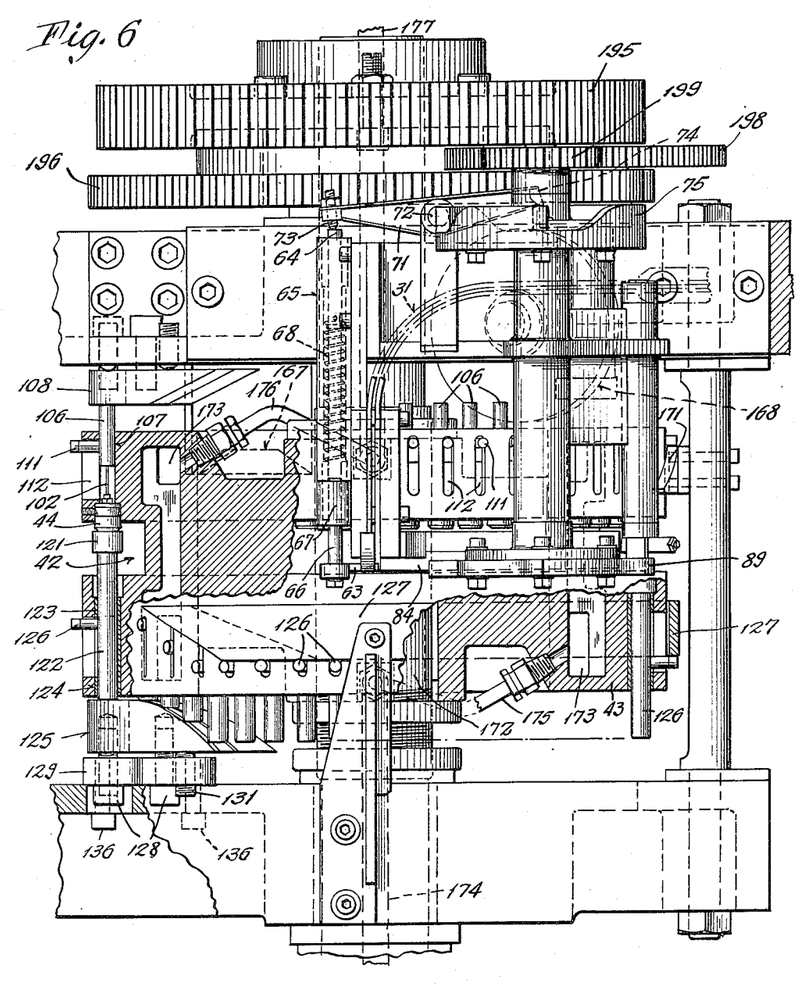
Fig. 6 is a plan view, partly in horizontal section, of the parts shown in Fig. 5.

As shown at the bottom of Fig. 6, the bracket 129 may be a separable member secured to the machine frame by cap screws 136.

Figure 25:
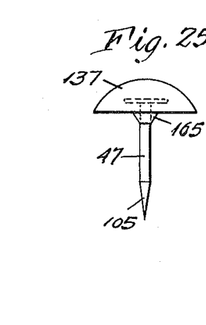
Fig. 25 illustrates a composite fastener as one example of product which can be made by the present invention.

In the illustrated machine, the nails 47 constitute the non-moldable part of the finished composite article, while the decorative head 137 comprises the part formed of moldable material, the finished composite article consisting of the two parts integrally joined together, as shown, for example, in Fig. 25.

Figures 1, 24:
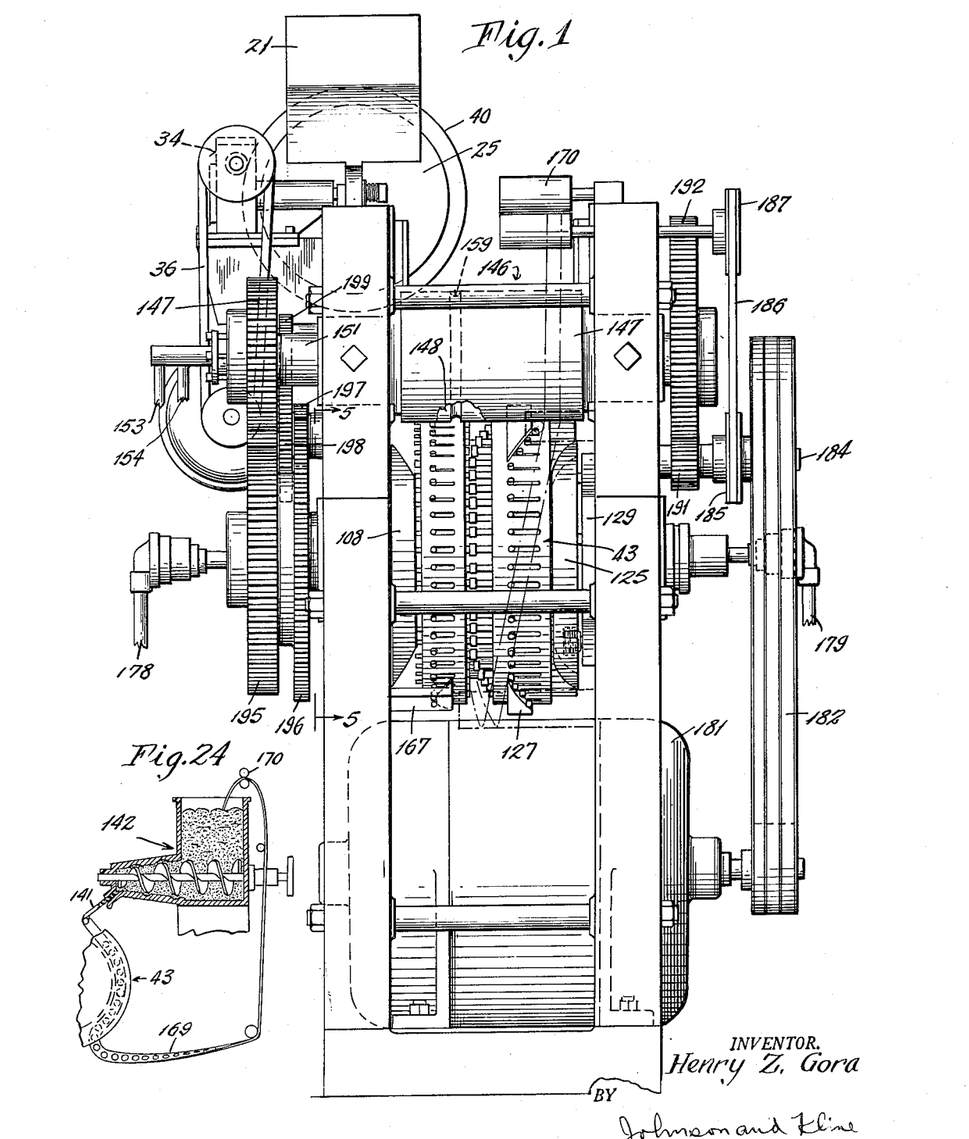
Figure 1 is a view in elevation of a machine constructed in accordance with one embodiment of the invention showing a plasticizing mill as one source of moldable material.
Fig. 24 shows in section an alternative type of mechanism for supplying the moldable material.

The moldable material is preferably provided in the form of a continuous strip 141 which can be supplied from any suitable source by any desired type of mechanism such, for example, as a screw operated extruding machine 142, as shown in Fig. 24, or a plasticizing mill 146, as shown in Fig. 1.

Such a mill, for example, includes a pair of rollers 147, 148, which are preferably differentially driven in order to increase the milling effect thereof. A batch 149 of raw material is fed to the rollers adjacent one end thereof and the layer of plastic material is built up on one of them which is usually maintained at a somewhat higher temperature than the other for this purpose. The temperature of the mill rollers can be controlled, for example, by passing temperature controlling fluid through the hollow shafts 151, 152 on which the rollers are mounted, and through connecting lines 153, 154.

The continuous strip 141 is cut from the layer built up on the roller 148 by rotary cutters 155 and guided over a guide roller 156. Preferably, the strip is preformed and given such a cross-sectional configuration as will insure filling the die cavities with the moldable material. In forming decorative nail heads in the present machine, the strip 141 is given a cross-section as shown in Fig. 13 in which the center 157 of the strip is considerably thicker than the lateral edges 158 thereof. For this purpose in producing the strip from the plasticizing mill, the roller 148 from which the strip is cut has a preforming groove 159 to preform the strip with the desired configuration.

From whatever source the strip 141 of moldable material may be obtained, it is guided into the circumferential slot 42 of the carrier 43 between the pairs of relatively movable molding dies 44, 121, for movement therewith through the operating zone. As illustrated, the strip is directed over a guide roller 161 and through a guide chute 162 by which it is directed into the slot 42 in edgewise position so that the central section 157 of greater thickness is located on the side of the strip toward the concave molding die 121, as shown in Figs. 13 and 17 to 22.

Figures 17, 18, 19, 23:
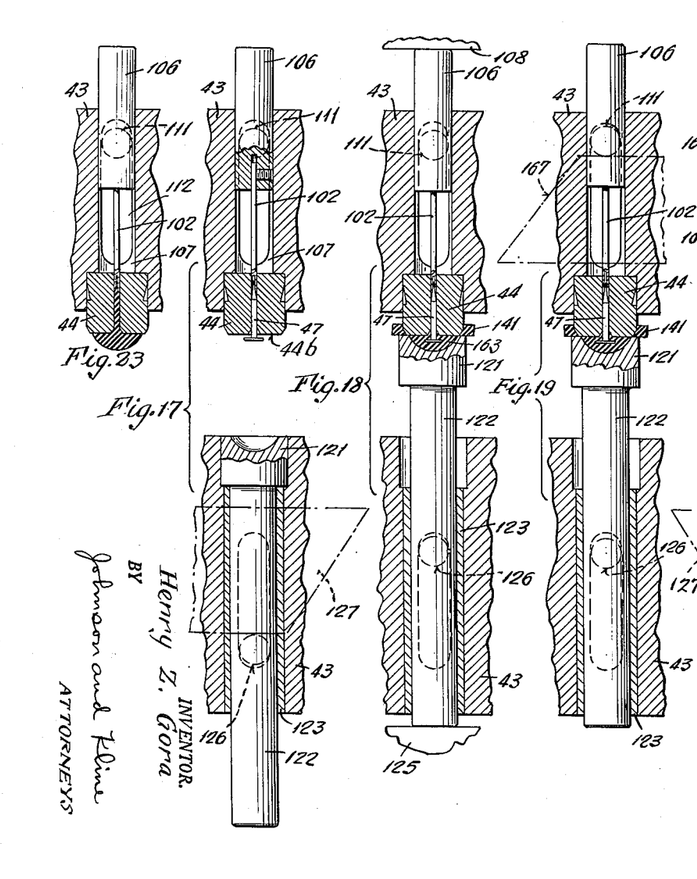
Figs. 17 to 22 are sectional views showing the successive movements of the molding dies.
Fig. 23 is a sectional view showing the effect of operating the dies when for any reason a non-moldable part is not loaded into one of the article-holding die members.

The sequential movements of the cooperating die members are best illustrated in Figs. 17 to 22. Fig. 17 shows the strip and the relatively movable die members as positioned at the moment the strip is introduced between the dies. Previous to this the nail 47 has been located in the nail holding die member 44. Rotation of the carrier 43 causes the gauge and ejector plunger 106 to move on to the face of the arcuate cam 108 at substantially the same time that the movable die-operating plunger 122 rides up on the face of the die closing cam 125. This operation causes the movable die member 121 to press the central part of the strip against the molding face 92 of the opposite nail holding die member 44 impaling the strip 141 and cutting out a circular central part 163 from the strip 141. The cut or blanked out part is then molded around the associated nail head which is held in proper position by the gauge and ejector member 102, the plunger 106 of which is in engagement with the holding cam 108, see Fig. 18. In this operation, the point of the nail is received within the mouth 104 of the ejector member 102, the end of which engages the tapered portion of the nail inwardly of the point 105 which is thus protected against damage and the nail securely held so as to properly position the nail head in the die cavity formed between the cooperating die members 44, 121. In the illustrated machine, the nail receiving aperture 44a of each article-holding die member 44 has a tapered mouth 164 by means of which a tapered neck 165 is formed under the head 137 around the shank 47 of the nail to provide a tapered underhead of molded material.

Figures 20, 21, 22:
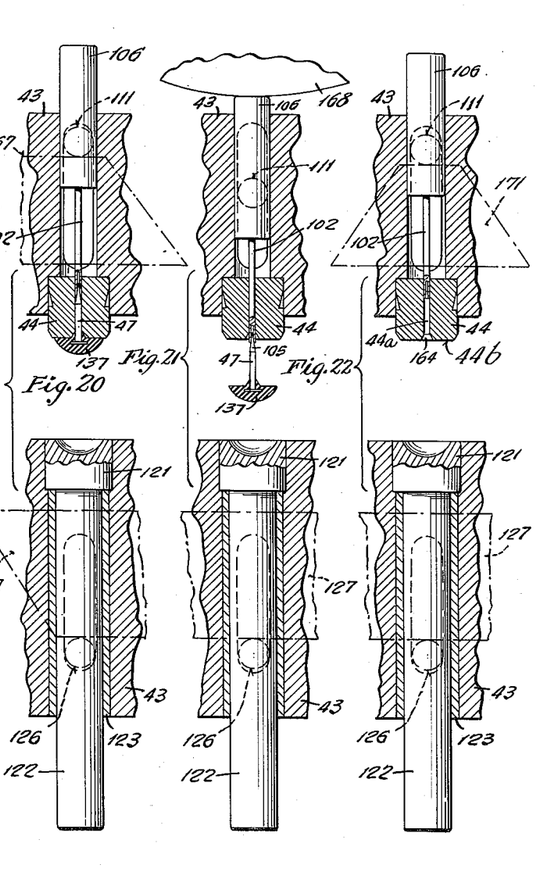

At the end of the molding operation, rotation of the carrier 43 causes the plungers 122, 106, to ride off the respective arcuate cam members 125, 108 to permit retraction of the associated plungers. The length of the cam member 125 determines the length of time the die members are maintained closed. As shown in Fig. 19, before ejecting the composite product the ejector member 102 is retracted sufficiently to free it from the nail point by an ejector retracting arcuate cam 167 engaging the cam follower pin 111 for this purpose. Thereupon the die opening cam 127 engages the cam follower pin 126 on the movable die plunger 122 to retract the movable die 121 and open the die cavity. Continued rotation of the carrier 43 then causes the ejector plungers 106 to move past an ejector operating wheel 168, forcing the ejector 102 outwardly, as shown in Fig. 21, and ejecting the composite article from the holding die member 44, from which it drops by gravity. The ejector 102 is formed to engage the wall of the aperture 44a so as to scrape all moldable material therefrom on its ejecting movement so as to clean the aperture for the repeat cycle of operations. The die opening cam 127 is of such arcuate length as to hold the movable dies 121 retracted during the remainder of their movement with the carrier until they again engage the closing cam 125. An ejector return cam 171 is suitably located to engage the ejector pin 111 and return the ejector to retracted position after the ejecting operation, see Fig. 22.

The skeletonized or perforated strip 169 is returned by power driven strip return rollers 170 to the batch 149 in the plasticizing mill or other strip forming mechanism where it is reincorporated in the original batch for return to the operating zone.

The rotary carrier 43 is supported on a shaft 172 rotatably mounted in the machine frame. Mechanism is provided for maintaining the temperature of the carrier at any desired point. For this purpose it is provided with an annular fluid passage 173 connected at one side of the carrier to a fluid passage 174 extending through one end of the supporting shaft at one side by a connecting line 175. On the opposite side of the carrier the fluid passage 173 is connected by a line 176 with a passage 177 extending through the opposite end of the supporting shaft. Fluid connections 178, 179, see Fig. 1, are connected to the respective passages 174, 177 for directing a temperature controlling fluid through the carrier.

The illustrated machine is operated by an electric motor 181 driving a belt 182 which passes over a pulley 183 on a stub shaft 184 carrying a pulley 185 connected by a belt 186 to a pulley 187 for operating the strip return pulleys 170. The shaft 184 carries a spur gear 191 driving a large gear 192 on the shaft which supports and drives the mill roller 148, the two mill rollers being connected by gears 193 of different pitch diameter for simultaneous rotation at differential speeds. The gear 193 on the shaft which supports mill roller 148 also drives a gear 194 driving a gear 195 on the carrier shaft 172 for rotating the carrier 43. A nail feed operating gear 196 is supported on the shaft 174 and is rotatably adjustable relative to the carrier rotating gear 195 by means of a bolt and slot connection 196a, see Fig. 4. The nail feed operating gear 196 drives a spur gear 197 secured to the same shaft as gear 196 which, in turn drives a cam shaft operating gear 199 on the cam shaft 76 which operates the nail feeding and loading cams 75 and 91.

It will be apparent, that the relative adjustment between the carrier driving gear 195 and the nail feeding gear 196 permits accurate timing of the nail loading operation relative to rotation of the carrier 43 so that the nail loading arm 63 will be operated at the exact moment to properly load each nail holding die member 44 as it passes through the loading station 41.

The faces of the die members 121 and 44 are preferably lubricated during rotation of the carrier. As illustrated in Figs. 5 and 15, lubricant is fed from any suitable source through a pipe 201 and delivered to an inclined lubricant supply tube 202 having a delivery nozzle 203 positioned in the carrier slot 42 in front of an air jet 204 by which the lubricant is blown against a spreader 205 which spreads the lubricant-laden air stream in opposite directions against the molding faces of the respective die members as they move past.

Figure 27:
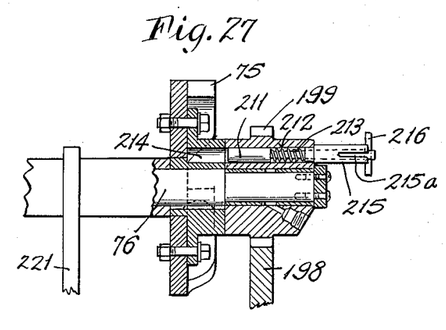
Figs. 27 and 28 illustrate certain mechanical details.
Figure 28:
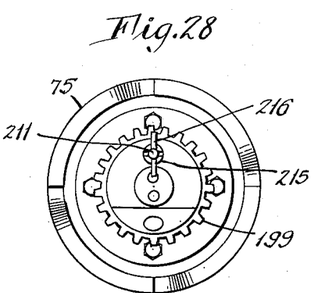

As shown in Fig. 26, the nail feeding mechanism is supported on bracket members 221 for bodily movement as an assembly into and out of operative relation to the feeding station, so that access to the article holding die members 44 can be readily obtained merely by swinging the nail feeding assembly out of the way. As shown in Fig. 26, the assembly supporting bracket members 221 are rotatably mounted on a supporting shaft 222 concentric with the axis of the driving gear 198. The entire feeding assembly can be swung from the operative position shown in full lines to the inoperative position diagrammatically indicated by broken lines. For this purpose, a hand lever 223 is rigidly secured to a link 224 pivotally connected to a link 225 to form a toggle normally holding the bracket member 221 and associated nail feeding mechanism in operative position as shown in full lines. A helical spring 226 is connected to an arm 227 on the link 225 and at its other end is connected to a pin 228. The spring 226 normally, yieldingly holds the toggle and the nail feeding mechanism in operative position. To move the mechanism to inoperative position, in order to gain access to the article holding die member 44 on the die carrier 43, the hand lever 223 is pressed downwardly to break the toggle 224—225 and swing the supporting brackets and nail feeding mechanism out of operative position to the inoperative position indicated by the broken lines in Fig. 26. This lifts the nail feeding mechanism out of the slot 42 and gives access to the die members. The mechanism can be held in inoperative position by any suitable latch such, for example, as a spring pressed latch pin 231 mounted in brackets 232 and normally projected into position to engage a locking pin 233 mounted on a suitable bracket 234. The pin is provided with a beveled end 235 permitting it to snap past the locking pin 233, which it engages under the tension of a helical spring 236, to hold the assembly in inoperative position. A release lever 237 is pivoted to the hand lever 223 and connected to the projecting end of the locking pin 231 for unlatching the pin to permit return of the assembly to the operative position shown in full lines. Movement of the assembly into and out of operative position causes the cam shaft gear 199 to roll around the periphery of the gear 198. However, such movement would normally be prevented by engagement of the cam lobes 91 with the end of the nail feeding rocker arm 87. In order to permit such movement it is necessary to disconnect the gear 199 from the cam shaft 76. Accordingly, as shown in Fig. 27, the gear 199 is rotatably supported on the cam shaft, and means is provided for connecting and disconnecting the gear and shaft. As illustrated, a spring pressed connecting pin 211 is mounted in a bore 212 extending through the gear 199 and is normally yieldingly pressed by a helical spring 213 into engagement with a pin receiving recess 214 in the hub of the adjacent cam 75. A slotted sleeve 215 is mounted in and projects outwardly from the bore 212 and cross rod 216 extends diametrically through the end of the pin 211. In order to disconnect the gear 199 and cam shaft 76 so as to permit rotation of the gear 199, the connecting pin 211 is retracted from the gear recess 214 against the pressure of the spring 213. When retracted sufficiently for the cross rod 216 to clear the slots 215a, the pin can be rotated to position the cross rod 216 in engagement with the end of the sleeve 215, in which position the pin 211 is entirely withdrawn from the recess 214 and the gear 199 is disconnected from the cam shaft 76. When the gear is so disconnected, and hence freely rotatable on the shaft, the nail feeding assembly can be easily swung into and out of operative position.

Figures 29, 30, 31, 32:
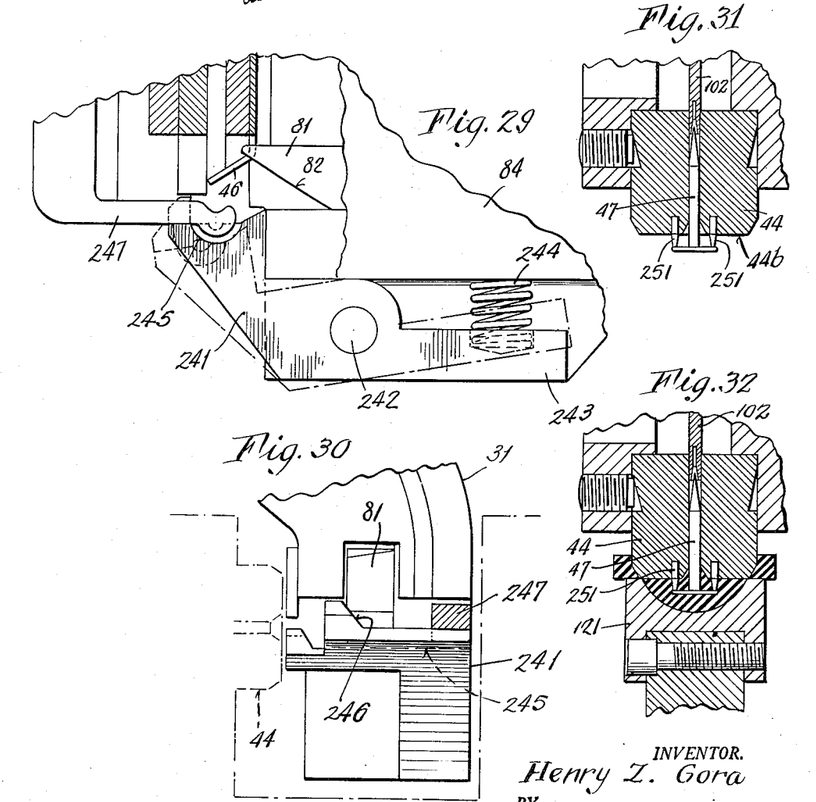
Figs. 29 and 30 show an alternative mechanism for loading nails into successive nail holders on the rotary carrier.
Figs. 31 and 32 illustrate an alternate arrangement for gauging the position of a nail in an article-holding member, before and after the molding operation, respectively.

A modified form of cradle for supporting the nail at the loading station is illustrated in Figs. 29 and 30. As shown, the cradle member 241 is pivotally mounted on a supporting pin 242 for bodily movement out of nail supporting position at the time of the loading operation. The cradle member includes an arm 243 which is normally spring pressed by a helical spring 244 to yieldingly retain the nail holding cradle 245 in nail loading position as shown in full lines in Figs. 29 and 30. The nail holding cradle is formed with a cam surface 246 adapted to be engaged by the nail loading arm member 247 which corresponds to the hereinabove described nail loading arm 63 and which is operated by the same mechanism. When the nail loading member 247 is snapped toward the holding die in the manner described above, it first engages the nail head lying in the cradle 245 to propel the nail into the die cavity. As the member is snapped forwardly it strikes the cam face 246 to swing the cradle away from the associated nail as indicated in dotted lines in Fig. 29. The member 247 can be designed, of course, to engage the cam face 246 and shift the cradle at any point in the operation of loading the nail into the holding die 44. Upon retraction of the nail driving member 247, the spring 244 restores the cradle to its operative nail supporting position.

In operation, the metallic nails are fed down the chute 31 from the rotary hopper 22 and successively delivered one at a time to the cradle 51 by the reciprocating feeder 81. Continuous rotation of the carrier 43 moves the nail holding die members 44 past the loading station where the nail loading member 63 is operated in accurately timed relation to insert a nail in each die member 44 as it moves past. Continued rotation of the carrier results in moving a series of nails and the strip of moldable material along contiguous paths through the operating zone and causes the respective cam members to operate the cooperating relatively movable die members 44, 121, in the manner and sequence above described in connection with Figs 17 to 22.

Figure 4:
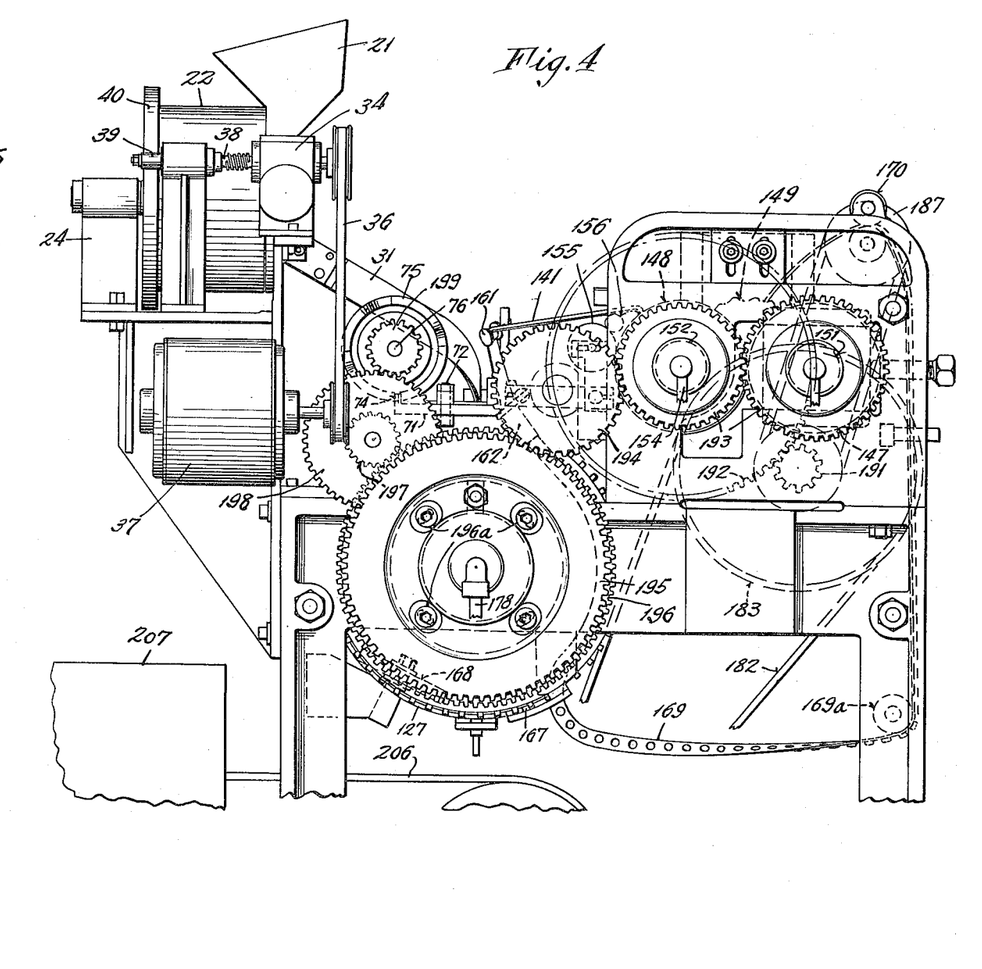
Fig. 4 is an elevation looking from the left of Fig. 1.

When the molding operation is completed and the molding die 121 returned to its inoperative position shown in Fig. 20, the perforated, skeletonized strip 168 is withdrawn from the carrier slot 42, directed over idler guide pulleys 169a, see Fig. 4, and returned to the batch 149 of material in the mill. The ejector wheel 168 then operates the ejector plunger 106 to move the ejector 102 through the die member 44, ejecting the composite article and expelling any residual moldable material from the die, leaving it clean and ready for the next molding operation.

The effectiveness with which the ejectors 102 clean the die members 44 of all moldable material after each molding operation is of great importance and advantage. Should a die member 44 be moved through the molding zone without a metallic nail having been placed in the bore or aperture 44a, as might happen in the event of the failure of the loading mechanism to deliver a nail which failure may be caused by a faulty nail being presented to the loading mechanism, the moldable material would be pressed into the bore 44a by the pressure of the molding operation filling the entire die cavity and bore up to the end of the ejector 102 as shown in Fig. 23. Upon subsequent operation of the ejector rod 102, however, the entire mass of moldable material, having the shape of the composite article is expelled from the die member 44 and the necessity of cleaning out the bores by hand is completely avoided.

Figs. 31 and 32 illustrate an alternative gauge device for fixing the position of a nail 47 in a die member 44. As illustrated, one or more pins 251 project outwardly from the die face 44b to engage the under surface of the nail head and position it in predetermined spaced relation to the die face 44b. With such an arrangement the fine adjustment of the ejector 102, which is required when it also functions as a gauge, is avoided and the ejector 102 can be employed for ejecting operations only. In such case the ejector 102 need not engage the nail shank during the molding operation. However, the nail head is exactly located in the correct position for the subsequent molding operation by the pins 251.

If the moldable material is such as to require curing, it can be easily cured in place by passing the composite article through a curing zone after ejection from the die member 44. For this purpose, the article can be deposited by gravity on a conveyor 206 for travel through a curing oven 207, or the like, as indicated in Fig. 4.

Although the speed of rotation of the carrier 43 may be set relatively high in order to obtain high production, the speed at which the molding dies 121 are made to approach the article holding die members 44 and, hence, the speed of cutting the moldable material and transferring the cut portion to the article can be fixed at any desired value merely by suitably designing the operating cam 125. In other words, the present machine can be operated at relatively high carrier speeds for the purposes of high production without causing a correspondingly high velocity movement of the dies 121. The movement of the latter can be held to any suitable speed without limiting the production rate of the machine.

It is apparent that the invention can be variously modified and adapted and that portions of the improvements can be used without others.

I claim:

1. A machine comprising in combination, a continuously rotating carrier, a series of article-holding means mounted on said carrier in spaced relation and traveling by the rotation of the carrier in a circular path, molding die faces formed on said article-holding means, charging mechanism for loading successive holding means during movement thereof with articles so that a part of each article is positioned adjacent to the associated die faces, means for guiding a continuous strip of moldable material into the circular path of travel of said article-holding means opposite said faces, a molding die mounted on said carrier in alignment with each holding means, said aligned molding dies and die faces each having cooperating surfaces to engage the strip and remove a portion thereof, means operated by the rotation of the carrier for causing relative movement between said article-holding means and said molding dies to cause the latter to penetrate said strip and mold said portion thereof around said article between said molding dies and the die faces on said holding means, and means operated by the further rotation of the carrier for retracting said molding dies to free said strip and the composite article therefrom.

2. A machine comprising in combination, a continuously rotating carrier, a series of article-holding means mounted on said carrier in spaced relation and traveling by the rotation of the carrier in a circular path, molding die faces formed on said article-holding means, charging mechanism for loading successive holding means during movement thereof with articles so that a part of each article is positioned adjacent to the associated die faces, means for plasticizing moldable material and producing a continuous strip therefrom, means for guiding said continuous strip into the circular path of travel of said article-holding means opposite said faces, a molding die mounted on said carrier in alignment with each holding means, said aligned molding dies and die faces each having cooperating surfaces to engage the strip and remove a portion thereof, means operated by the rotation of the carrier for causing relative movement between said article-holding means and said molding dies to cause the latter to blank out a portion only of said strip and mold said portion thereof around said article between said molding dies and the die faces on said holding means, means operated by the further rotation of the carrier for retracting said molding dies to free the blanked-out strip and the composite article therefrom, and means for guiding the freed strip back to the plasticizing means.

3. A machine comprising in combination, a continuously rotating carrier, a series of article-holding means mounted on said carrier in spaced relation and traveling by the rotation thereof in a circular path, a die face formed on each article-holding means, an intermittently operating charging mechanism past which said article-holding means travel for inserting said articles in successive holding means during traveling movement thereof so that a part of each article is positioned adjacent the associated die face, means controlled by the rotation of the carrier for operating the charging mechanism when an article-holding means is in predetermined position to receive an article from the charging mechanism, means for guiding moldable plastic material into the circular path of travel of said article-holding means adjacent to said die faces, a molding die mounted on said carrier in alignment with each holding means, said aligned molding dies and die faces each having cooperating surfaces to engage the strip and remove a portion thereof, and means for causing relative movement between each article-holding means and the associated molding die to cause the molding die to blank out a portion only of said moldable material and to mold said portion of said material around said article between said molding die and said die face.

4. The invention as defined in claim 3 in which the charging mechanism includes a cradle supporting said article and a quick-acting device controlled by the rotation of said carrier for thrusting the article from said cradle into said article holding means as the latter passes the charging mechanism.

5. A machine comprising a rotary carrier, a series of article-holding means mounted on and spaced around the carrier for successive movement past a loading station, through a molding zone of predetermined length, and past a delivery station, means for loading each holding means at said loading station with a non-moldable part of a composite article, means for guiding a strip of moldable plastic material to the path of movement of said holding means for movement therewith in said molding zone, molding dies mounted on said carrier one in aligned spaced relation to each holding means, the strip of moldable material passing through the space between the molding dies and the article-holding means, and means for moving said aligned article-holding means and molding dies relatively to bring them together under pressure for removing a portion of the strip lying between them and flow-molding said portion onto the non-moldable part during passage thereof through the molding zone.

6. A machine comprising in combination, a rotary carrier, a series of article-holding means mounted on said carrier and traveling by the rotation thereof in a circular path, molding die faces formed on said article-holding means, charging mechanism for loading successive holding means during movement thereof with articles having a headed shank, means for positioning each article in its holder so that the head is in spaced relation to its associated die face, means for guiding a continuous strip of moldable plastic material into the circular path of travel of said article-holding means adjacent to said faces, a molding die mounted on said carrier in alignment with each holding means, said aligned molding dies and die faces each having cooperating surfaces to engage the strip and remove a portion thereof, and means for causing relative movement between said article-holding means and said molding dies to cause the molding dies to penetrate said strip and flow-mold said portion of said moldable material around the head of said article between said molding dies and said die faces.

7. A machine comprising a drum mounted on a horizontal axis, a plurality of members for holding elongate articles having shanks on said drum movable therewith past a loading station, said holding members having bores open on one face of the drum for receiving the shanks of the articles, a chute to receive and support a succession of articles for delivering the same to said loading station in a horizontal position, a cradle shaped to receive an article from said chute and support it in horizontal position adjacent the path of the holders for delivery to an approaching holder at said loading station, a yieldable stop for normally closing the end of said chute adjacent said cradle, means for transferring successive articles one at a time to said cradle including a wedge to segregate the lowermost article in said chute and feed it past said yieldable stop onto said cradle, and support the next adjacent article, a loading member movable across the cradle to engage the article, move it horizontally and insert its shank in the bore of the holder, trip-controlled quick-acting means for operating the loading member during movement of said holder past said cradle, and means for tripping said quick-acting means in timed relation to the movement of the carrier.

8. The method of making composite articles comprising a non-moldable part and a part molded thereon which includes the steps of loading one of each pair of a series of pairs of traveling dies with a non-moldable part as they pass a loading station, causing said dies to travel in a closed path, causing a strip of moldable material to travel in a path at least partially overlapping the path of the dies loaded with said non-moldable parts, bringing the dies of each pair together at an overlapping portion of said paths to remove from the strip a quantity of moldable material and mold it on the non-moldable part, maintaining a plurality of pairs of said dies closed for a predetermined time, and opening said dies to free the composite article therefrom for removal.

9. The method of making composite articles comprising a non-moldable part and a part molded thereon which includes the steps of loading one of each pair of a series of pairs of traveling dies with a non-moldable part as they pass a loading station, causing said dies to travel in a closed path, causing a strip of moldable material to travel in a path at least partially overlapping the path of the dies loaded with said non-moldable parts, bringing the dies of each pair together at the overlapping portion of said paths to remove from the strip a quantity of moldable material and mold it on the non-moldable part, maintaining a plurality of pairs of said dies closed for a predetermined time, opening said dies to free the composite article therefrom for removal, and ejecting the composite article from the die supporting it.

10. The method of making composite articles comprising a non-moldable part and a part molded thereon which includes the steps of loading one of each pair of a series of pairs of traveling dies with a non-moldable part as they pass a loading station, causing said dies to travel in a closed path, causing a strip of moldable material to travel in a path at least partially overlapping the path of the dies loaded with said non-moldable parts, bringing the dies of each pair together at the overlapping portion of said paths to remove from the strip a quantity of moldable material and mold it on the non-moldable part, maintaining a plurality of pairs of said dies closed for a predetermined time, opening said dies to free the composite article therefrom for removal, ejecting the composite article from the die supporting it, and guiding the residue of the strip of moldable material back to the source from which it came.

11. A rotary carrier having an annular slot, a series of article-holding means mounted on said carrier along one side of said slot for movement past a loading station, mechanism for delivering articles one at a time to said loading station including an article feeding chute, an article-supporting cradle adapted to receive articles from said chute and support them in position for delivery to said holding means by said loading station, means for depositing successive articles from said chute on said cradle, means for feeding successive articles from said cradle to said article-holding members, and means supporting said chute, said cradle and said feeding means for movement as an assembly unit into and out of operative position relative to said slot and said loading station.

12. A rotary carrier having an annular slot, a series of article-holding means mounted on said carrier along one side of said slot for movement past a loading station, mechanism for delivering articles one at a time to said loading station including an article feeding chute, an article-supporting cradle adapted to receive articles from said chute and support them in position for delivery to said holding means by said loading station, means for depositing successive articles from said chute on said cradle, means for feeding successive articles from said cradle to said article-holding members, and means supporting said chute, said cradle and said feeding means for movement as an assembly unit into and out of operative position relative to said slot and said loading station, including a toggle for holding said assembly unit in operative position, means for breaking said toggle and moving said unit to inoperative position, and a latch for holding said assembly unit in inoperative position.

13. A rotary carrier having an annular slot, a series of article-holding means mounted on said carrier along one side of said slot for movement past a loading station, mechanism for delivering articles one at a time to said loading station including an article feeding chute, an article-supporting cradle adapted to receive articles from said chute and support them in position for delivery to said holding means by said loading station, means for depositing successive articles from said chute on said cradle including an article feeding cam, a gear for operating said cam, means for feeding successive articles from said cradle to said article-holding members, means supporting said chute, said cradle and said feeding means for movement as an assembly unit into and out of operative position relative to said slot and said loading station, and means for disconnecting said operating gear from said article feeding cam to permit said movement of said assembly.

14. The method of molding articles which comprises the steps of milling between mill rollers a quantity of moldable material until one of the mill rollers has an enveloping surface layer of plasticized material of the desired degree of plasticity and of predetermined substantially uniform thickness except a minor portion thereof which has substantially greater thickness having a cross-section compatible with the cross-section of the article to be molded; cutting and removing from a portion of the layer including said portion of greater thickness a continuous plasticized strip; and removing pieces from the thicker portions of said strip and molding the same to form articles.

15. The method of molding articles which comprises the steps of milling between mill rollers a quantity of moldable material until one of the mill rollers has an enveloping surface layer of plasticized material of the desired degree of plasticity and of predetermined substantially uniform thickness except a minor portion thereof which has substantially greater thickness having a cross-section compatible with the cross-section of the article to be molded; cutting and removing from a portion of the layer including said portion of greater thickness a continuous plasticized strip; loading one of each pair of a series of pairs of die members with a tack so that the head thereof projects from the die member; and bringing the die members together through at least a portion of the thicker portion of the plasticized strip to remove a portion of said strip and mold over, around and under said tack head an enlarged head of said moldable material.

16. A machine comprising, in combination, a rotary carrier; a circular row of article-supporting and positioning means mounted on the carrier and traveling by the rotation thereof in a circular path; means for guiding a continuous strip of plastic moldable material into the circular path of travel of said article-positioning means; a plurality of molding dies mounted on said rotary carrier and aligned with each article-positioning means; and means actuated by the rotation of the carrier for causing relative movement between said article-supporting means and its aligned molding die to cause the molding die to sever a portion of said strip of moldable material and mold said portion on the article supported by said article-supporting means.

17. A machine comprising, in combination, a rotary carrier; a circular row of article-supporting and positioning means mounted on the carrier and traveling by the rotation thereof in a circular path; a molding die face on each said article-supporting means; means for guiding a continuous strip of moldable plastic material into the circular path of travel of said article-supporting means; a plurality of molding dies mounted on said rotary carrier one aligned with each article-supporting means, said aligned molding dies and die faces each having cooperating surfaces to engage the strip and remove a portion thereof; and means for causing relative movement and pressure between said article-supporting means and its aligned molding die to cause said portion of the strip of moldable material to be blanked out and flow-molded between said die face and molding die and over the article supported by said article-supporting means.

18. A machine for making covered tacks and the like comprising a rotary carrier; a circular row of tack holding means mounted on said carrier in spaced relation and traveling by the rotation of the carrier in a circular path past a loading station, said tack holding means each having a bore to receive the shank of a tack, a die face surrounding the bore and means for spacing the head of the tack from said die face; means at the loading station to insert a tack in the bore of each holding means as it passes the loading station; means for guiding a continuous strip of moldable plastic material into the circular path of travel of said tack holding means; a plurality of molding dies mounted in said rotary carrier each aligned with one of said tack holding means, said aligned molding dies and die faces each having cooperating surfaces to engage the strip and remove a portion thereof; and means causing relative movement between said tack holding means and the molding die to cause the latter to penetrate said strip and flow-mold said portion over, around and under the head of the tack to cover the same.

19. A machine comprising a rotary carrier, a series of article holding members mounted on the carrier in spaced relation and each having a bore to receive and support an elongate article, said carrier and holding members traveling continuously past a loading station; means delivering said articles one at a time to the loading station; a relatively stationary cradle at the loading station for receiving and supporting an article in position for transfer to an approaching holding member on the carrier; and thrusting means operated in timed relation to the operation of the carrier for pushing the elongate article supported by the cradle into the bore of an aligned holding member, said cradle being so constructed and arranged as to hold said article free for lateral bodily movement with the moving holding member as the elongate article enters into and travels with the article holding member moving past said loading station.

20. The invention as defined in claim 19 in which there are trip-controlled quick-acting means for operating said article thrusting means.

21. The invention as defined in claim 19 in which the bores of the article holding members are horizontal and the cradle supports the elongate article horizontally with its article substantially coaxial with the axis of the holder bore at the instant that the bore and article become aligned.

22. The invention as defined in claim 21 in which the cradle has a means positioned to engage and support the shank of a headed elongate article, and the thrusting member engages the head of the article and then said shank engaging means of the cradle to remove the same from the path of the head after the shank has entered the bore of said holding member.

23. The method of making composite articles comprising a non-moldable part and a part molded thereon which includes the steps of advancing a series of pairs of aligned dies for movement in a closed path past a loading station, causing a strip of moldable plastic material to travel in a path at least partially overlapping the path of the dies, loading one of each pair of said dies with a non-moldable part as they pass the loading station, bringing the dies of each pair together through said strip at the overlapping portion of said paths to remove from the strip a quantity of moldable material, depositing said quantity on the non-moldable part, and opening said dies to free the composite article therefrom for removal.

24. The method of making composite articles comprising a non-moldable part and a part molded thereon which includes the steps of loading one of each pair of a series of pairs of aligned traveling dies with a non-moldable part as they pass a loading station, each pair of dies forming between them a molding cavity causing said dies to travel in a closed path; causing a strip of moldable plastic material to travel in a path at least partially overlapping the path of the dies loaded with said non-moldable parts; bringing the dies of each pair together through said strip at the overlapping portion of said paths to remove from the strip a quantity of moldable material and close the molding cavity to mold said material on the non-moldable part; maintaining said dies closed for a predetermined time; and opening said dies to free the composite article therefrom for removal.

25. The method of continuously producing composite articles each comprising a non-moldable part having an elongate portion and a part molded thereon which includes the steps of loading the elongate portion of each said part into a bore of one of a succession of die members; causing said die members to travel in a closed path; causing a strip of moldable material to travel in a path at least partially overlapping the path of the die members loaded with said elongate parts; bringing said die members and cooperating die members together at the overlapping portion of said paths to remove from the strip a quantity of moldable material and close the dies to mold the material on the said non-moldable part; maintaining a plurality of said die members closed for a predetermined time to set the material to its molded shape; and separating said cooperating die members to free the composite article therefrom for removal.

26. The method of continuously producing composite articles comprising a non-moldable part and a part molded thereon which includes the steps of loading one of each pair of a series of pairs of aligned traveling die members with a non-moldable part as they pass a loading station; causing said die members to travel in a closed path; causing a strip of moldable material to travel in a path at least partially overlapping the path of the die members loaded with said non-moldable parts; bringing the die members of each pair together through said strip at the overlapping portion of said paths to remove from between the side edges of the strip a quantity of moldable material, to mold it on the non-moldable part and to impale the strip on the die members for traveling movement therewith; maintaining a plurality of pairs of said dies closed for a predetermined time; and separating said die members to free the strip therefrom.

27. The method of continuously producing composite articles comprising an elongate headed non-moldable part and a part molded on said head which includes the steps of loading into a bore of one of each pair of a series of pairs of aligned traveling die members the elongate portion of said non-moldable part as the bore of said die member passes it at a loading station, each pair of dies forming between them a molding cavity; positioning the said head in spaced relation to the die member carrying the non-moldable part; causing said die members to travel in a closed path; causing a strip of moldable material to travel in a path at least partially overlapping the path of the die members carrying said non-moldable parts; bringing the die members of each pair together at the overlapping portion of said paths to remove from the strip a quantity of moldable material, to close the molding cavity to flow the material around and enclose the head of the non-moldable part; maintaining said die members closed for a predetermined time to set the material to its molded shape; and opening said die members to free the composite article therefrom for removal.

28. The method of continuously producing composite articles each comprising a non-moldable part having an elongate portion and a part molded thereon which includes the steps of loading the elongate portion of each said part into a bore of one of a succession of die members; causing said die members to travel in a closed path; causing a strip of moldable material to travel in a path at least partially overlapping the path of the die members loaded with said elongate parts; bringing said die members and cooperating die members together at the overlapping portion of said paths to remove from the strip a quantity of moldable material and close the dies to mold the material on the said non-moldable part; separating said cooperating die members to free the composite article therefrom for removal; and passing a close-fitting rod through the bore of said die for the full length thereof to completely remove from the bore the molded composite article or any moldable material disposed therein in the absence of a non-moldable part therein.

29. The method of providing tacks with composition head coverings which comprises moving a series of naked tack heads and a strip of head-covering molding composition along adjacent paths at the same speed and maintained in spaced overlapping relation, and during movement of said strip and tacks and where said paths overlap pressing the strip against successive tack heads and blanking from the strip a predetermined quantity of molding composition and pressing the same over, around and under the tack head and forming and molding the composition to desired finished shape and size in place on the tack head, and continuing the molding operation of one head-covering to set the composition while forming and molding a head-covering on a succeeding tack in the series.

HENRY Z. GORA.

REFERENCES CITED

The following references are of record in the file of this patent:

UNITED STATES PATENTS

| Number | Name | Date |
|---|---|---|
| 534,446 | Miller | Feb. 19, 1895 |
| 1,272,634 | Escobales | July 16, 1918 |
| 1,610,295 | Latham | Dec. 14, 1926 |
| 1,807,155 | Frederick | May 26, 1931 |
| 2,009,751 | Stenman | July 30, 1935 |
| 2,027,915 | Kux | Jan. 14, 1936 |
| 2,055,742 | Burke | Sept. 29, 1936 |
| 2,086,128 | Hackbarth et al. | July 6, 1937 |
| 2,119,659 | Upton | June 7, 1938 |
| 2,231,165 | King et al. | Feb. 11, 1941 |
| 2,303,005 | Swangren | Nov. 24, 1942 |
| 2,380,042 | Hauton | July 10, 1945 |